United States Patent
Hersam et al.

(10) Patent No.: US 9,834,693 B2
(45) Date of Patent: Dec. 5, 2017

(54) METHODS FOR PREPARATION OF CONCENTRATED GRAPHENE INK COMPOSITIONS AND RELATED COMPOSITE MATERIALS

(71) Applicant: Northwestern University, Evanston, IL (US)

(72) Inventors: Mark C. Hersam, Wilmette, IL (US); Yu Teng Liang, Chicago, IL (US); Ethan B. Secor, Evanston, IL (US); Pradyumna L. Prabhumirashi, Chicago, IL (US); Kanan P. Puntambekar, Chicago, IL (US); Michael L. Geier, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 14/121,097

(22) Filed: Jul. 30, 2014

(65) Prior Publication Data

US 2015/0072162 A1    Mar. 12, 2015

Related U.S. Application Data

(63) Continuation-in-part of application No. 13/453,608, filed on Apr. 23, 2012, now Pat. No. 9,079,764.

(60) Provisional application No. 61/861,257, filed on Aug. 1, 2013, provisional application No. 61/478,361, filed on Apr. 22, 2011.

(51) Int. Cl.
| | | |
|---|---|---|
| *C01B 31/02* | (2006.01) | |
| *H01B 1/24* | (2006.01) | |
| *C09D 11/38* | (2014.01) | |
| *C09D 11/14* | (2006.01) | |
| *C09D 11/52* | (2014.01) | |

(52) U.S. Cl.
CPC .............. *C09D 11/38* (2013.01); *C09D 11/14* (2013.01); *C09D 11/52* (2013.01); *H01B 1/24* (2013.01); *Y10T 428/31721* (2015.04); *Y10T 428/31786* (2015.04)

(58) Field of Classification Search
CPC .............. H01B 1/04; H01B 1/24; C01B 31/02
USPC ........ 252/500–519.1; 423/445 R–447.1, 460, 423/461
See application file for complete search history.

(56) References Cited

U.S. PATENT DOCUMENTS

| | | | | |
|---|---|---|---|---|
| 2008/0279756 | A1* | 11/2008 | Zhamu | C01B 31/0423 423/448 |
| 2010/0000441 | A1 | 1/2010 | Jang et al. | |
| 2010/0176351 | A1* | 7/2010 | Ruoff | B82Y 30/00 252/510 |
| 2011/0049437 | A1* | 3/2011 | Crain | C09D 5/24 252/511 |
| 2011/0189452 | A1* | 8/2011 | Lettow | B05D 3/10 428/220 |
| 2011/0284805 | A1* | 11/2011 | Samulski | B82Y 30/00 252/503 |
| 2011/0311432 | A1* | 12/2011 | Pu | B82Y 30/00 423/460 |
| 2015/0072162 | A1 | 3/2015 | Hersam et al. | |

FOREIGN PATENT DOCUMENTS

| | | | | |
|---|---|---|---|---|
| CN | 104263082 A | 1/2015 | | |
| WO | WO2010071858 A1 * | 6/2010 | ............. | C01B 31/04 |
| WO | 2014210584 A1 | 12/2014 | | |

OTHER PUBLICATIONS

Yang ("Fabrication of High-Concentration and Stable Aqueous Suspensions of Graphene Nanosheets by Noncovalent Functionalization with Lignin and Cellulose Derivatives." JPCC, 114, pp. 3711-3816, web Feb. 12, 2010).*
Liang ("Highly Concentrated Graphene Solutions via Polymer Enhanced Solvent Exfoliation and Iterative Solvent Exchange." JACS, 132, pp. 17661-17663, Web Nov. 29, 2010).*
Hernandez, Y. et al., "High-Yield Production of Graphene by Liquid-Phase Exfoliation of Graphite", Nature Nanotechnology, vol. 3, Sep. 2008, 563-568.
Gao, W. et al., "New Insights into the Structure and Reduction of Graphite Oxide", Nature Chemistry, vol. 1, Aug. 2009, 403-408.
Green, A. et al., "Solution Phase Production of Graphene with Controlled Thickness via Density Differentiation", Nano Letters 2009, vol. 9, No. 12, 4031-4036.
Hernandez, Y., et al., "Measure of Multicompartment Solubility Parameters for Graphene Facilitates Solvent Discovery", Langmuir, 2010, 26 (5), 3208-3213.
Secor, E. et al., "Inkjet Printing of High Conductivity, Flexible Graphene Patterns", The Journal of Physical Chemistry Letters, 2013, vol. 4, No. 8, 1347-1351.
International Search Report and Written Opinion for PCT/US2016/048322 dated Nov. 30, 2016, 16 pages.

* cited by examiner

*Primary Examiner* — Tri V Nguyen
(74) *Attorney, Agent, or Firm* — Reinhart Boerner Van Deuren s.c.

(57) ABSTRACT

A rapid, scalable methodology for graphene dispersion and concentration with a polymer-organic solvent medium, as can be utilized without centrifugation, to enhance graphene concentration.

16 Claims, 17 Drawing Sheets
(9 of 17 Drawing Sheet(s) Filed in Color)

Figure 1
Figure 1A
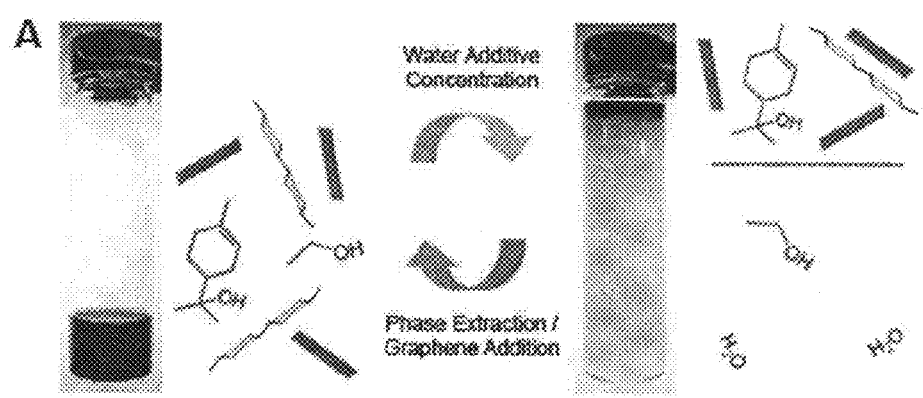
Figure 1B
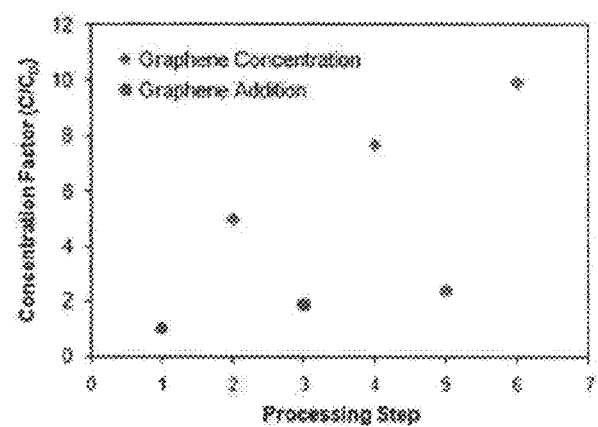

Figure 3A
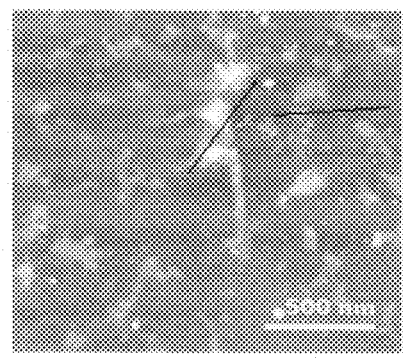
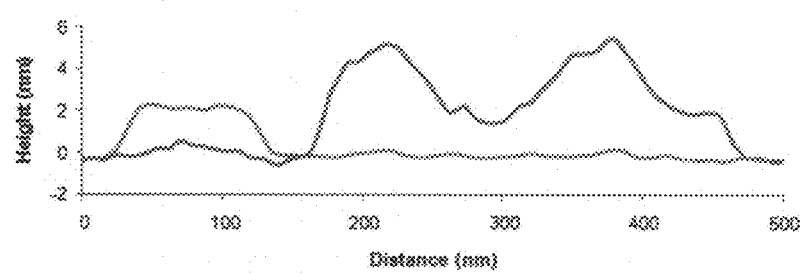
Figure 3B

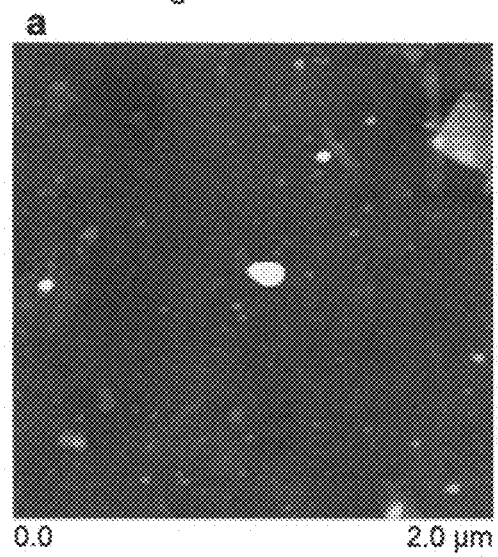
Figure 9A
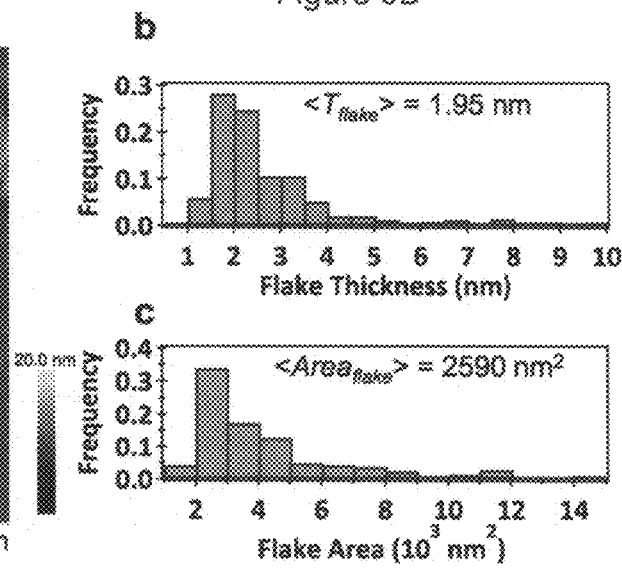
Figure 9B
Figure 9C

Figure 12A
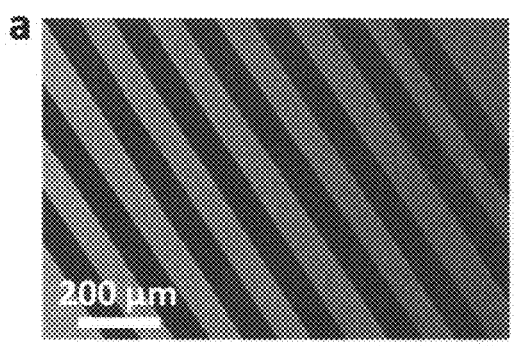
Figure 12B
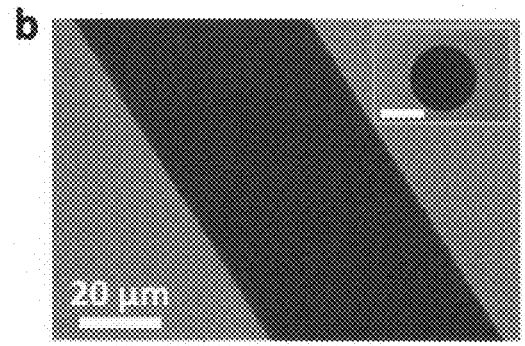
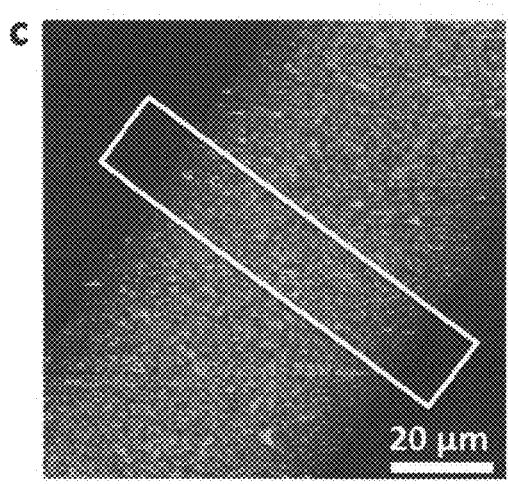
Figure 12C
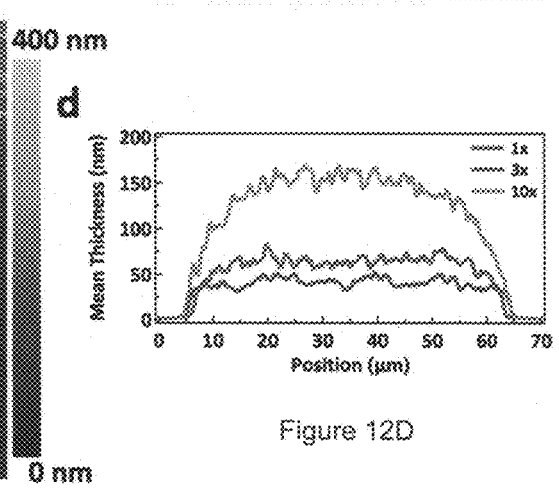
Figure 12D

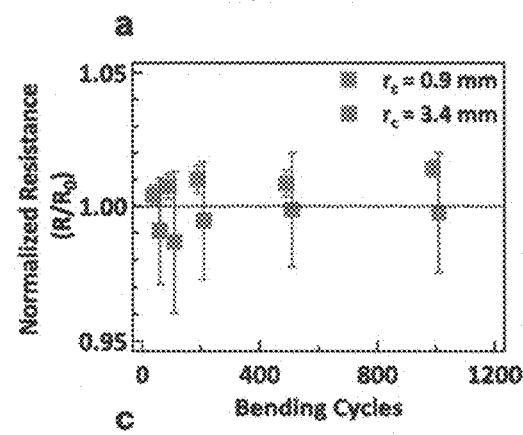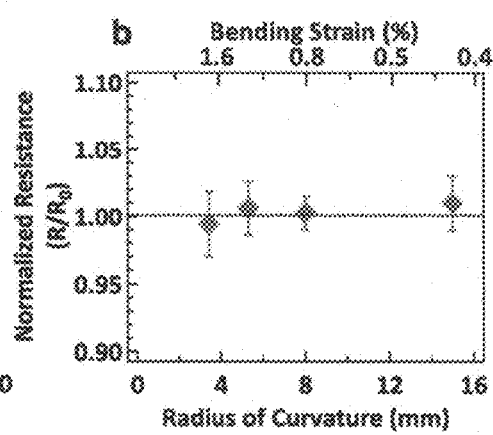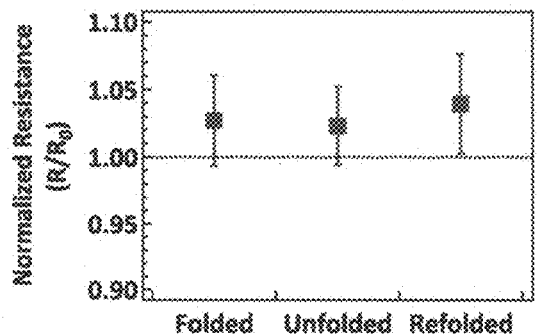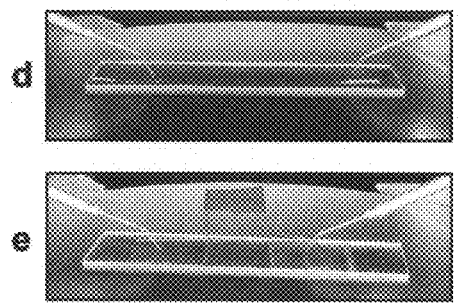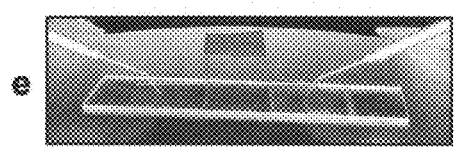
Figure 15A
Figure 15B
Figure 15C
Figure 15D
Figure 15E

METHODS FOR PREPARATION OF CONCENTRATED GRAPHENE INK COMPOSITIONS AND RELATED COMPOSITE MATERIALS

This application claims priority benefit of application Ser. No. 61/861,257 filed Aug. 1, 2013 and is a continuation-in-part of and claims priority benefit of application Ser. No. 13/453,608 filed Apr. 23, 2012, which claimed priority benefit of application Ser. No. 61/478,361 filed Apr. 22, 2011—each of which is incorporated herein by reference in its entirety.

This invention was made with government support under grant number DE-FG02-03ER15457 awarded by the Department of Energy and grant number N00014-11-1-0690 awarded by the Office of Naval Research. The government has certain rights in the invention.

BACKGROUND OF THE INVENTION

Graphene, a two-dimensional $sp^2$-hybridized lattice of carbon atoms, has generated intense interest due to its unique electronic, mechanical, chemical, and catalytic properties. Recent synthetic efforts have focused on the development of high-yield and scalable methods of generating graphene. These techniques include the direct exfoliation of either chemically modified or pristine graphene directly into various solvents. For example, graphene oxide (GO) can be exfoliated from graphite via acidic treatments. The resulting GO flakes contain hydroxyl, epoxyl, carbonyl, and carboxyl groups along the basal plane and edges that render GO strongly hydrophilic. The ease of dispersing GO in solution has facilitated the preparation of GO thin films and GO-polymer nanocomposites with interesting and potentially useful mechanical properties. However, due to the defects and consequent disruption of the graphene band structure introduced during oxidation, GO is a poor electrical conductor. Although the level of oxygenation can be partially reversed through additional chemical reduction steps, significant quantities of structural and chemical defects remain. Moreover, the electrical conductivity of reduced GO flakes is less than optimal and is certainly deficient by comparison to pristine graphene.

In an effort to circumvent such GO limitations, recent efforts have focused on direct solution-phase exfoliation of pristine graphene. Graphene sheets can be extracted using superacids, by sonication in surfactant solutions and through use of organic solvents. For example, superacids have demonstrated an unprecedented graphene solubility of 2 mg/mL through the protonation and debundling of graphitic sheets. However, the resulting solutions are not ideally suited for additional processing due to their acidity-dependent solubility and high reactivity. Direct exfoliation of graphene in surfactant solutions and select organic solvents has also been demonstrated with concentrations up to 0.3 mg/mL and 1.2 mg/mL, respectively, but such concentrations are achieved only following prolonged sonication times—approaching 3 weeks in duration—or extended ultracentrifugation.

Concurrently, printed electronics offers an attractive alternative to conventional technologies by enabling low cost, large area, flexible devices that have the potential to enable unique advances in varied applications such as health diagnostics, energy storage, electronic displays, and food security. Among available manufacturing techniques, inkjet printing-based fabrication is a promising approach for rapid development and deployment of new material inks. The main advantages of this technology include digital and additive patterning, reduction in material waste, and compatibility with a variety of substrates with different degrees of mechanical flexibility and form-factor. Various technologically important active components have been inkjet printed including transistors, solar cells, light-emitting diodes, and sensors. Despite these device-level advances, the ability to pattern low-resistance metallic electrodes with fine resolution remains an important challenge, especially as the field evolves towards highly integrated systems.

As discussed above, graphene is a prominent contender as a metallic component in printed electronic devices due to its high conductivity, chemical stability, and intrinsic flexibility. In particular, graphene inks provide an alternative to conventional carbon-based inks that have shown limited conductivity, especially in formulations compatible with inkjet printing. However, such an application requires the production of large-area graphene that can be easily manipulated into complex device architectures. Some of the primary methods that are being explored for the mass production of graphene include growth by chemical vapor deposition (CVD), sublimation of Si from SiC, and solution-phase exfoliation of graphite or reduced graphene oxide (RGO). Among these approaches, solution-phase exfoliation offers significant advantages such as inexpensive raw materials, potential for scalability, low thermal budget, and compatibility with additive printing techniques. Exploiting these attributes, previous studies have demonstrated inkjet printing of RGO for organic thin-film transistor electrodes, temperature sensors, radio frequency applications, and chemical sensors. Nevertheless, since the electrical properties of RGO are inferior to graphene, inkjet printing of pristine graphene flakes is expected to have clear advantages in electronic applications.

Graphene can be directly exfoliated by ultrasonication in select solvents and superacids, or through the use of additives such as planar surfactants and stabilizing polymers, resulting in relatively small (<10 $\mu m^2$ in area) graphene flakes. While small flakes are necessary for stable inkjet printing, they introduce an increased number of flake-to-flake junctions in percolating films, which renders them more resistive compared to CVD grown or mechanically exfoliated graphene. Moreover, traditional solvents and surfactants employed for graphene exfoliation leave persistent residues even following extensive annealing, further disrupting the conductive network.

Processing complexities represent a bottleneck for fundamental studies and end-use applications that require well-dispersed, highly concentrated, pristine graphene solutions. Accordingly, there remains an on-going search in the art for an improved approach to graphene solution concentrations—of the sort suitable for inkjet printing and related applications—sufficient to better realize the benefits and advantages available from graphene and related material compositions.

SUMMARY OF THE INVENTION

In light of the foregoing, it is an object of the present invention to provide methods relating to the preparation of concentrated graphene media, together with corresponding compositions and composites available therefrom, thereby overcoming various deficiencies and shortcomings of the prior art, including those outlined above. It will be understood by those skilled in the art that one or more aspects of this invention can meet certain objectives, while one or more aspects can meet certain other objectives. Each objective may not apply equally, in all its respects, to every aspect of this invention. As such, the following objects can be viewed in the alternative, with respect to any one aspect of this invention.

It can also be an object of the present invention to provide a rapid, scalable methodology for preparation of highly-concentrated graphene media without impractical, time-inefficient, excessively-long sonication and/or centrifugation procedures.

It can be an object of the present invention to provide an economical, efficient approach to the preparation of graphene solutions, dispersions and related graphene ink compositions, using low-cost organic solvents, such compositions at concentrations sufficient, and surface tension and viscosity tunable, for a range of end-use applications.

It can also be an object of the present invention, alone or in conjunction with one or more of the preceding objectives, to provide a low temperature, environmentally benign approach to stable inkjet graphene printing en route to the fabrication of high-conductivity patterns suitable for flexible or foldable electronics.

Other objects, features, benefits and advantages of the present invention will be apparent from the summary and the following descriptions of certain embodiments, and will be readily apparent to those skilled in the art having knowledge of various graphene preparation methods and inkjet printing applications. Such objects, features, benefits and advantages will be apparent from the above as taken into conjunction with the accompanying examples, data, figures and all reasonable inferences to be drawn therefrom.

In part, the present invention can provide a method of using a cellulosic polymer for preparing concentrated graphene media and related compositions. Such a method can comprise exfoliating a graphene source material with a medium comprising an organic solvent at least partially miscible with water and a cellulosic polymer dispersing or stabilizing agent at least partially soluble in such an organic solvent; contacting at least a portion of such an exfoliated graphene medium with a hydrophobic fluid component; and hydrating such a graphene medium to concentrate exfoliated graphene in such a hydrophobic fluid component. Without limitation, such concentration can be achieved without application of centrifugal force.

Alternatively, the present invention can provide a method of using a cellulosic polymer for preparing concentrated graphene media and related compositions. Such a method can comprise providing a graphene source material; exfoliating such a graphene source material with a medium comprising an organic solvent at least partially miscible with water and a dispersing or stabilizing agent comprising a cellulosic polymer, such a dispersing agent at least partially soluble in such an organic solvent; contacting at least a portion of such an exfoliated graphene medium with an aqueous medium to concentrate exfoliated graphene in a composition comprising graphene and such a cellulosic polymer; and contacting such a graphene-cellulosic polymer composition with a hydrophobic fluid component. Without limitation, exfoliating a graphene source material can be achieved through shear mixing such a material with such a medium.

In certain non-limiting embodiments, such an organic solvent can be selected from suitable alcohols, esters, amides, ethers, and ketones and combinations thereof, such a solvent as can partially solubilize such a cellulosic dispersing agent. In certain such embodiments, such a solvent can comprise ethanol or dimethylformamide. Regardless of solvent identity, such a dispersing/stabilizing agent can comprise a cellulose polymer about 46- about 48% ethoxylated.

Without limitation as to identity of an organic solvent and/or a dispersing agent, a hydrophobic fluid component of this invention can be selected from fluid hydrophobic components at least partially miscible with such an organic solvent but immiscible with water. Such hydrophobic components can include, without limitation, chloroform, ~$C_6$-~$C_8$ alkanes, terpenes, terpene alcohols and combinations thereof, optionally together with compositions comprising one or more such components and one or more suitable co-dispersants. In certain embodiments, such a hydrophobic fluid component can comprise a terpineol or, alternatively, a terpineol and cyclohexanone. Regardless, such a method can utilize a graphite as a graphene source material.

Without limitation as to organic solvent, dispersing agent and/or hydrophobic fluid component, a method of this invention can comprise iterative separation of a graphene-hydrophobic fluid component from such an organic solvent medium, and subsequent contact with another portion of such an exfoliated graphene medium. Alternatively, a method of this invention can, optionally, comprise iterative concentration of a graphene-cellulosic polymer composition and subsequent dispersion. Regardless, a resulting concentrated graphene ink can be deposited or printed on a substrate component, then can be annealed to at least partially remove and/or decompose residual dispersing/stabilizing cellulosic agent.

In part, the present invention can also be directed to a method of concentrating a graphene medium. Such a method can comprise exfoliating graphene from a graphene source material with a medium comprising an organic solvent selected from ethanol and dimethylformamide, and an ethyl cellulose; contacting at least a portion of such an exfoliated graphene medium with a terpineol; adding water to the graphene medium to concentrate exfoliated graphene within such a terpineol component; separating such a graphene-terpineol component from such a hydrated medium; and, optionally, iterative contact of such a separated graphene-terpineol fluid component with additional portions of an exfoliated graphene medium, to concentrate graphene therein. Such concentration can be achieved absent centrifugation. A graphene ink resulting from such iterative concentrations can be applied to a suitable substrate, then annealed to remove dispersing agent.

In part, the present invention can also be directed to a method of preparing a graphene ink composition. Such a method can comprise exfoliating graphene from a graphene source material with a medium comprising an organic solvent selected from ethanol and dimethylformamide, and an ethyl cellulose; contacting at least a portion of such an exfoliated graphene medium with an aqueous (e.g., without limitation, an aqueous NaCl solution) medium to concentrate exfoliated graphene and ethyl cellulose; and contacting such a graphene-cellulose composition with a hydrophobic fluid (e.g., without limitation, comprising a terpineol and cyclohexanone) component. In certain non-limiting embodiments, exfoliating a graphene source material can comprise or can be achieved by shear mixing such a material and such a medium. Regardless, a resulting graphene ink composition can be applied to, deposited and/or printed on a suitable substrate then annealed.

Accordingly, the present invention can also be directed to a composition comprising graphene, a hydrophobic fluid component and a graphene dispersing/stabilizing agent at least partially soluble in such a hydrophobic fluid component. Without limitation, such a dispersing/stabilizing agent can comprise ethyl cellulose. In various embodiments, regardless of dispersing/stabilizing agent, such a hydrophobic fluid component can comprise a component selected from terpenes, terpene alcohols and related compositions. In certain such embodiments, such a hydrophobic fluid component can comprise a mixture of terpineol and cyclohexanone. Thermal annealing can provide such a composition comprising a decomposition product of ethyl cellulose.

Regardless, an ink composition of this invention can comprise a graphene concentration of up to or greater than about 3 mg/ml. Without limitation as to any particular graphene concentration, such a composition can comprise small, unagglomerated graphene flakes, such a morphology as can be evidenced by atomic force microscopy. Regardless, in certain embodiments, such a composition can be printed or patterned on a substrate and annealed, providing such a printed composition a conductivity of greater than about $2 \times 10^4$ S/m.

The present invention can, in part, be directed to a composite comprising such a graphene ink composition coupled to a flexible or foldable polymeric substrate component, such a graphene composition as can be inkjet printed on such a substrate. Such a composition can be considered as comprising an annealation/decomposition product of ethyl cellulose-stabilized graphene. Regardless, with respect to such an ink composition, print morphology, electrical performance and mechanical properties can be substantially maintained over repeated substrate bending or folding.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A-B. (A) Digital images of vials of a 1:5 mixture of terpineol and ethyl cellulose stabilized graphene-ethanol solution before and after water addition. As shown by the images, upon the addition of water, the hydrophobic graphene flakes preferentially separate into the concentrated terpineol fraction, leaving behind an ethanol and water mixture. (B) The concentration factor of graphene ($C_0$=102.4 μg/mL) is plotted after each solvent exchange concentration and graphene-ethanol addition step for three iterations.

FIGS. 3A-B. (A) Digital AFM image of graphene flakes deposited on $SiO_2$. (B) Line scan profiles of two deposited graphene flakes, with the larger flake exhibiting edge folding.

FIGS. 9A-C. Characterization of graphene flakes. (A) A representative digital AFM scan of the graphene flakes that was used to obtain particle statistics. Histograms of (B) flake thickness and (C) flake area for 355 and 216 flakes, respectively.

FIG. 12A-D. Morphology of inkjet printed graphene features on HMDS-treated $Si/SiO_2$. Digital scanning electron micrographs of (A) multiple printed lines and (B) a single printed line and drop (inset, scale bar corresponds to 40 μm) illustrate the uniformity of the printed features. (C) A digital atomic force microscopy (AFM) image of a single line following 10 printing passes that shows no coffee ring features. (D) Averaged cross-sectional profiles of printed lines after 1, 3, and 10 printing passes, which demonstrate the reliable increase in thickness obtained after multiple printing passes. The cross-sectional profiles are obtained from the averaged AFM height profile over ~20 μm as indicated by the boxed region in (C).

FIGS. 15A-E. Flexibility assessment of printed graphene lines on Kapton® substrates. (A) Resistance of graphene lines folded to a radius of curvature of 0.9 mm (blue, bending strain: 6.9%) and 3.4 mm (red, bending strain: 1.8%) normalized to the resistance prior to bending. (B) Normalized resistance of graphene lines measured in a flexed state for various degrees of bending, showing reliable retention of electrical conductivity across all measured flex states. (C) Normalized resistance of graphene lines while measured in a folded state, showing a small and irreversible increase in resistance following folding. Digital images of the sample in the (D) original and (E) folded state.

DETAILED DESCRIPTION OF CERTAIN EMBODIMENTS

Figure 1C:
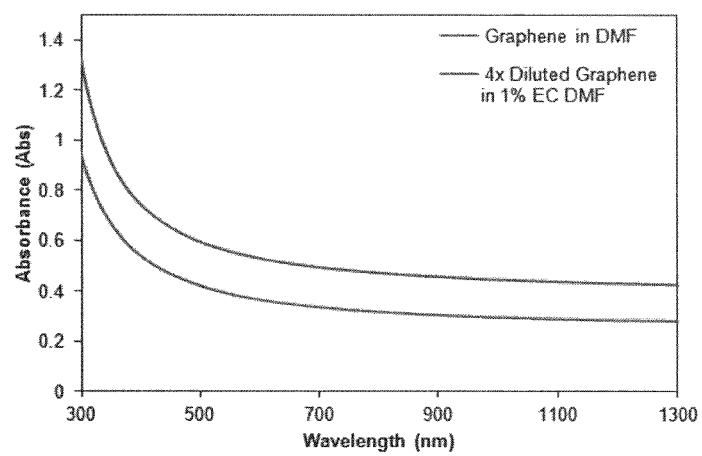
FIG. 1C. UV-vis absorbance spectra for graphene dispersed in DMF (upper plot) and 1% w/v EC-DMF (lower plot). Due to the high graphene concentration of the EC-DMF dispersion, the sample was diluted 4× in DMF to obtain a clear absorbance spectra.

Without limitation, various embodiments of this invention demonstrate an alternative strategy for enhancing graphene exfoliation using a polymer-organic solvent composition. More specifically, as relates to certain such embodiments, a room-temperature, ultracentrifuge-free concentration technique can be used to generate graphene concentrations in excess of 1 mg/mL in organic solvents that otherwise yield poor graphene dispersability. The resulting graphene inks are amenable to further processing, including casting into aligned graphene-polymer nanocomposites and blade coating to form thin films, as a result of their low solvent boiling point and non-causticity. Because the present invention avoids oxidative conditions, the graphene maintains superlative electronic properties, which can be exploited in applications that require highly conductive, mechanically flexible, and solution-processable coatings.

Due to the large mismatch between the surface energies of ethanol and graphite, ethanol is a relatively poor solvent for graphene exfoliation, yielding a post-sedimentation concentration of 1.6 µg/mL. (See, Hernandez, Y.; Lotya, M.; Rickard, D.; Bergin, S. D.; Coleman, J. N.; *Langmuir* 2010, 26, 3208-3213.) To overcome this limitation, a cellulosic polymer was used to enhance the ability of ethanol to exfoliate and suspend graphene flakes. Such polymers include, but are not limited to ethyl cellulose, methyl cellulose, hydroxyethyl cellulose, carboxymethyl cellulose, and hydroxypropylmethyl cellulose. Using ethyl cellulose (EC), a solution of 50 mg/mL natural graphite flakes in 1% w/v EC-ethanol was sonicated for 3 hr and centrifuged at 7,500 rpm for 4.5 hr to remove the fast sedimenting graphite flakes. The resulting supernatant provides primarily few-layer graphene sheets. Optical absorbance was taken to determine the graphene concentration using an absorption coefficient of 2,460 L/g·m at 660 nm. Without limitation as to any one theory or mode of operation, addition of up to about 1% or more EC significantly enhanced the graphene exfoliation efficiency by providing steric stabilization of the exfoliated flakes, yielding a post-sedimentation concentration Of 122.2 µg/mL. Despite this improvement, still higher concentrations were desired to generate graphene inks that can be easily deposited and patterned.

Towards this end, an iterative solvent exchange was employed as a rapid room-temperature process to concentrate graphene solutions—without the application of centrifugal force. Various hydrophobic fluid solvent components at least partially miscible with an organic solvent such an ethanol (or e.g., dimethylformamide or methylpyrrolidone), but not miscible with an aqueous solvent component (e.g., ethanol and water) can be utilized. In particular, a 1:5 volume ratio solution of terpineol and sedimented graphene solution was prepared and mixed to yield a solution with an initial graphene concentration of $C_0$=102.4 µg/mL. Water, four times the volume of this initial solution, was then added to form a hydrophilic ethanol solution. Again, without limitation to theory or mode of operation, because of the hydrophobicity of the EC-stabilized flakes, graphene is believed preferentially concentrated into the terpineol band on top of the ethanol-water solution (FIG. 1A). This terpineol phase was then harvested and additional sedimented graphene solution was added for the next concentration iteration. Concentration factors, $C/C_0$, were determined after each step through optical absorbance for three concentration iterations (FIG. 1B). As expected, the concentration factors correspond roughly to the volumetric reduction of the graphene solution, producing a highly concentrated graphene ink at 1.02 mg/mL after three iterations. Additional iterations of solvent exchange yielded diminishing returns as the viscosity of the graphene ink begin to interfere with material separation within the system. In order to verify the absence of flake agglomeration during the concentration process, atomic force microscopy was performed on over 140 flakes deposited from the sedimented graphene solution and the third iteration graphene ink. Both media exhibited similar flake thickness histograms peaked at approximately 1.6-1.8 nm (FIG. 2A), suggesting minimal graphene agglomeration during the concentration process.

Figure 2A:
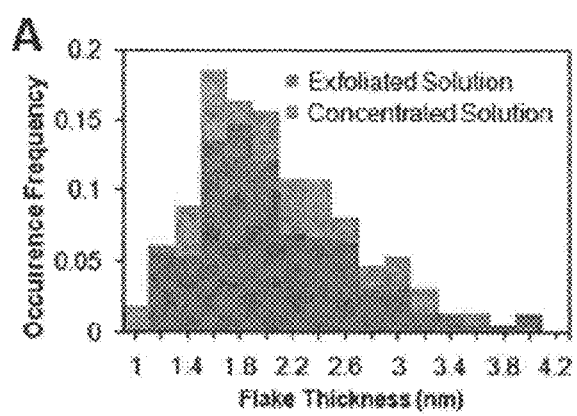
FIGS. 2A-D. (A) Histograms of flake thickness for the initially exfoliated and third-iteration concentrated graphene solutions. (B) Digital scanning electron micrograph (SEM) images of a graphene-ethyl cellulose nanocomposite fracture surface. (C) Optical transmittance versus sheet resistance for annealed transparent conductive thin films blade coated from the concentrated graphene inks. (D) Digital SEM image of an annealed graphene thin film.
Figure 2B:
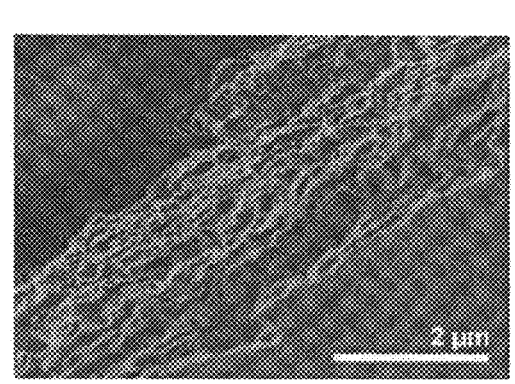

Graphene-polymer nanocomposites were solution cast from these graphene inks. The height reduction associated with anisotropic volume contraction during solvent evaporation resulted in the directional alignment of the graphene flakes within the nanocomposite. In FIG. 2B, this alignment is evident on the fracture surface in the form of sheared terraces orthogonal to the direction of the volumetric contraction. The lack of protruding graphene flakes on the fracture surface is not only indicative of flake alignment but also suggests strong interactions between the polymer and graphene.

Figure 2C:
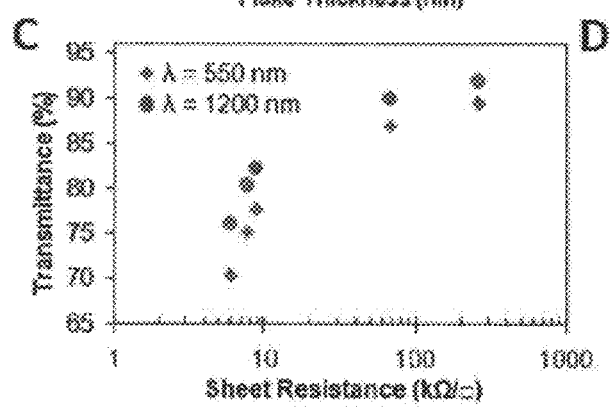
Figure 2D:
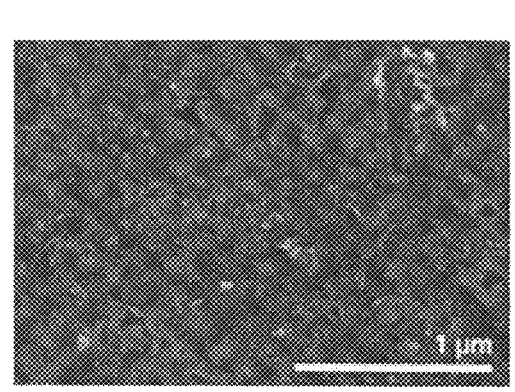

The electrical properties of thin films derived from the concentrated graphene ink were assessed via transparent conductor measurements. Due to their enhanced rheology, film forming capability, and dispersion stability, EC-stabilized graphene inks are amenable to blade coating onto a broad range of substrates. For example, graphene inks were blade coated onto glass slides at varying thicknesses, annealed at 400° C. for 30 min in air, and rinsed with acetone to produce transparent conductive thin films. Four point probe measurements of the film sheet resistance indicate that their electrical performance compare favorably to films deposited by vacuum filtration from sedimented surfactant graphene solutions (FIG. 2C). Electron microscopy performed on these conductive graphene thin films (FIG. 2D) reveals a disordered network of graphene flakes with lateral dimensions ranging from approximately 50-400 nm. Raman spectra provide further evidence that these graphene thin films possess low defect densities and negligible oxidation.

As demonstrated, efficient graphene exfoliation can be achieved in ethanol through polymeric stabilization using ethyl cellulose. The resulting graphene solutions can be concentrated via rapid, room-temperature, ultracentrifugation-free iterative solvent exchange, ultimately yielding stable graphene inks at mg/mL levels. The outstanding processability and electrical properties of the resulting inks enable the straightforward production of functional graphene-based materials including highly anisotropic polymer nanocomposites and transparent conductive thin films. Such results can promote ongoing efforts to understand and exploit solution-processable pristine graphene for fundamental studies and device applications.

Figure 8A:
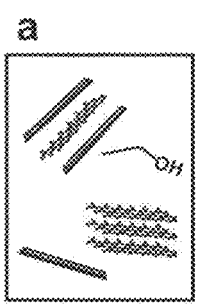
FIGS. 8A-F. Schematic illustration of the ink preparation method. (A) Graphene is exfoliated from graphite powder in ethanol/EC by probe ultrasonication. A graphene/EC powder is then isolated following (B) centrifugation-based sedimentation to remove residual large graphite flakes and (C) salt-induced flocculation of graphene/EC. (D) An ink for inkjet printing is prepared by dispersion of the graphene/EC powder in 85:15 cyclohexanone:terpineol. Digital images of (E) vial of the prepared graphene ink and (F) drop formation sequence for inkjet printing, with spherical drops forming after ~300 μm.
Figure 8B:
Figure 8C:
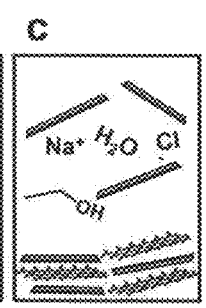
Figure 8D:
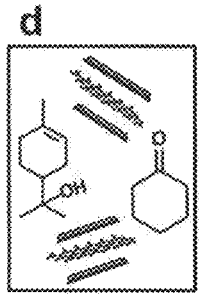
Figure 8E:
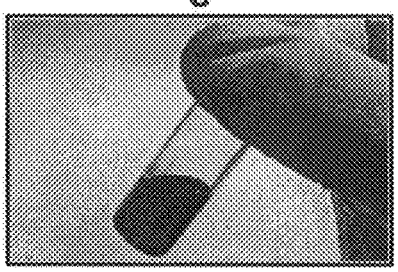
Figure 8F:
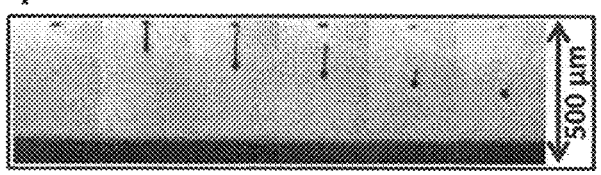
Figure 10A:
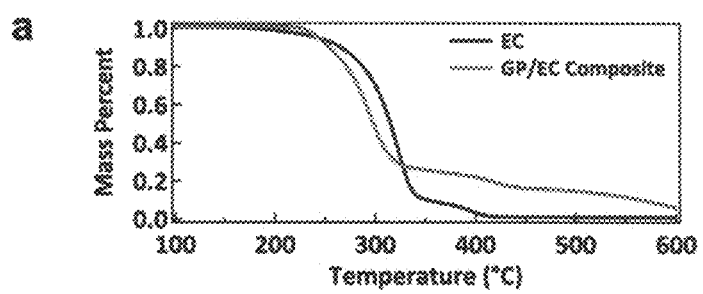
FIGS. 10A-B. TGA of pure EC (black) and graphene/EC composite powder (red), showing (A) mass as a function of temperature and (B) the differential mass loss. For the composite powder, the decomposition peaks of EC in (B) are shifted to different temperatures due to the presence of graphene.
Figure 10B:
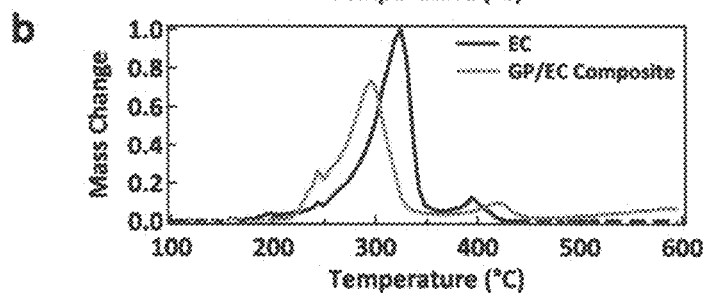

Relating to certain such embodiments of this invention, graphene inks were produced by the exfoliation of graphite in ethanol and ethyl cellulose (EC), as described more fully below. Generally, such a process primarily produces few-layer graphene sheets, with typical thicknesses of ~2 nm and areas of ~50×50 $nm^2$ (FIG. 9). Processing steps are illustrated schematically in FIG. 8. In particular, excess graphite and EC were used to achieve high yields of suspended graphene (>0.1 mg/mL). Sedimentation-based centrifugation was then employed (FIG. 8A-B) to remove remaining large graphite flakes, yielding a dispersion of ~1:100 graphene/EC in ethanol. To remove excess EC and solvent, a room-temperature method based on the flocculation of graphene/EC was developed. Specifically, upon the addition of NaCl(aq), a solid containing graphene and EC was flocculated and collected following a short centrifugation step (FIG. 8C). This graphene/EC solid was subsequently washed with water and dried, yielding a black powder with a graphene content of ~15% (FIG. 10), which is significantly higher than the graphene/EC ratio in the original dispersion. Because EC encapsulates graphene flakes in solution, no irreversible aggregation of graphene was observed. The resulting powder is readily dispersed in a variety of solvents, allowing for the tailoring of inks for a range of deposition methods. In particular, dispersion of this material in select organic solvents (FIG. 1D-E) enables deposition of graphene by inkjet printing (FIG. 8F).

Figure 11:
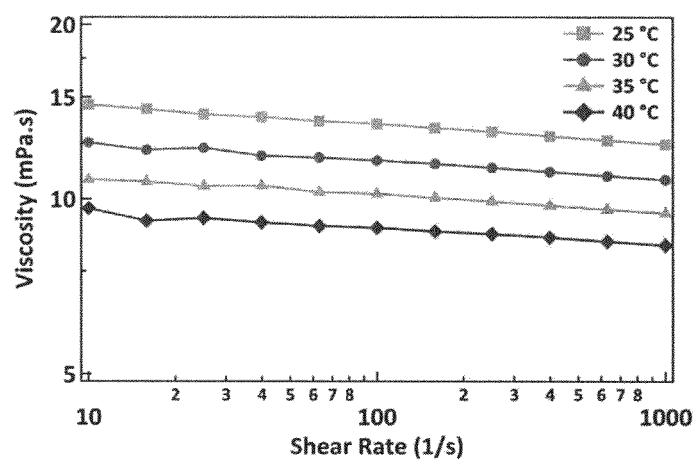
FIG. 11. Shear viscosity of the graphene ink over a shear rate range of 10-1000 $s^{-1}$ at temperatures of 25, 30, 35 and 40° C.

Inkjet printing requires careful tailoring of the viscosity and surface tension of the ink formulation to achieve stable droplet formation. The wetting and drying properties of the ink must also be tuned to achieve proper morphology of the printed features. Furthermore, inks should not possess large particles or volatile solvents since these components can lead to clogging of the inkjet printhead. Finally, a high concentration of graphene is desired to reduce the number of necessary printing passes. To achieve these goals, the graphene/EC powder was dispersed in a 85:15 mixture of cyclohexanone:terpineol (FIG. 8D). At a concentration of 2.4 wt % graphene/EC composite (~3.4 mg/mL graphene), this ink has a surface tension of ~33 mN/m and a high shear rate (100-1000 $s^{-1}$) viscosity of 10-12 mPa·s at 30° C. (FIG. 11).

The relatively low surface tension of this ink is designed for proper wetting of low surface energy substrates applicable to flexible electronics. To assess the electrical characteristics of the ink, a well-defined substrate of $Si/SiO_2$ with 300 nm thermally grown oxide was used. For a more suitable model of wetting and drying on low surface energy substrates, the $Si/SiO_2$ substrate was treated with hexamethyldisilazane (HMDS) to decrease the surface energy. Printing was carried out at 300° C. using a Fujifilm Dimatix Materials Printer (DMP 2800) with a cartridge designed for a 10 pL nominal drop volume. Drop spacing for all printed features was maintained at 20 μm. Stable printing of graphene lines on HMDS-treated $Si/SiO_2$ yielded a line width of ~60 μm, as shown in FIG. 12A-C. The highly uniform dome-shaped cross-sectional profile across the lines provides evidence for successful ink formulation, specifically showing no undesirable coffee ring effects. Importantly, this advantageous cross-sectional profile was maintained after multiple printing passes, as shown in FIG. 12D. This excellent morphology of the printed features is, without limitation, believed attributable to the suppression of the coffee ring effect through a Marangoni flow established by the surface tension gradient that develops due to solvent evaporation. This flow homogenizes the droplet composition, resulting in a uniform morphology of the printed features. Again, without limitation to any one theory or mode of operation, the $sp^2$-bonding and small lateral size of the graphene flakes minimizes folding or buckling of the printed flakes, which promotes low surface roughness and well-defined flake-flake contacts.

Figure 13A:
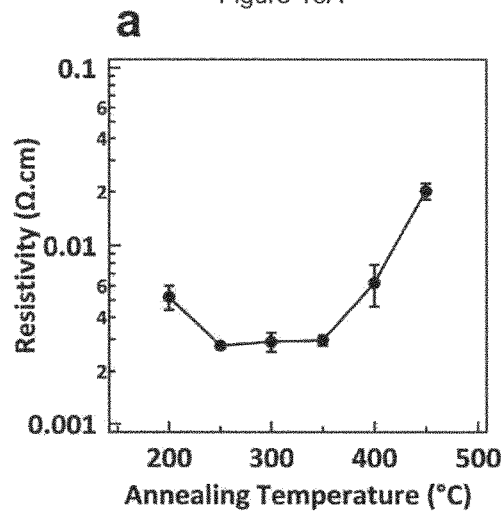
FIGS. 13A-D. Electrical characterization of graphene features. (A) Electrical resistivity of blade-coated films plotted against annealing temperature for a fixed annealing time of 30 minutes, showing effective binder decomposition at 250° C. and increased resistivity due to graphene oxidation above 400° C. (B) Dependence of electrical resistivity on annealing time for a fixed annealing temperature of 250° C., showing that low resistivity is achieved following annealing for 20 minutes. (C) Thickness of inkjet printed graphene lines on HMDS-treated $Si/SiO_2$ for increasing numbers of printing passes. (D) Electrical resistivity of the printed features for increasing numbers of printing passes, showing relatively stable performance after only 3 printing passes.
Figure 13B:
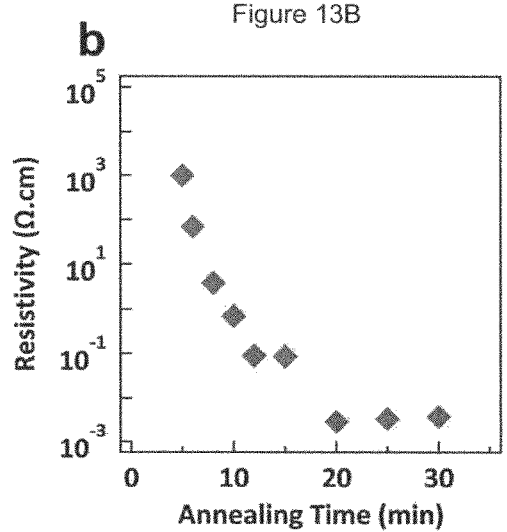

The polymeric binder EC encapsulates graphene flakes following solvent evaporation, and subsequent thermal annealing can be employed to obtain highly conductive features. To study the electrical behavior of the composite material as a function of annealing conditions, films were blade-coated on glass slides and annealed in an ambient atmosphere with systematic variations in the annealing time and temperature. As shown in FIG. 13A, a 250-350° C. anneal for 30 minutes results in high conductivity graphene films. At 250° C., annealing for as short as 20 minutes was sufficient to achieve low resistivity (FIG. 13B). For the remainder of this study, the annealing temperature and time of 250° C. and 30 minutes, respectively, were chosen to enable compatibility with flexible electronics applications.

Figure 13C:
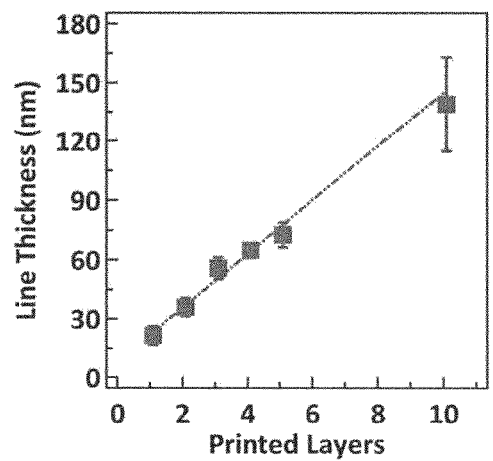
Figure 13D:
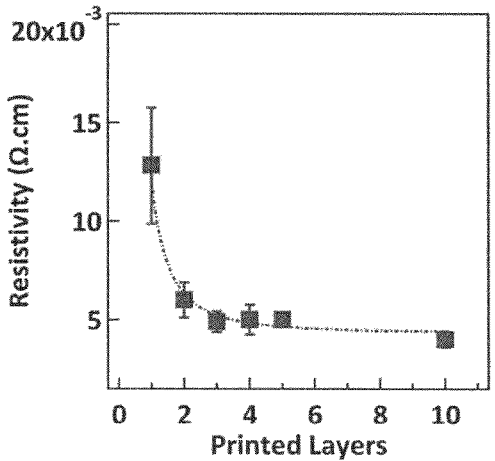
Figure 14A:
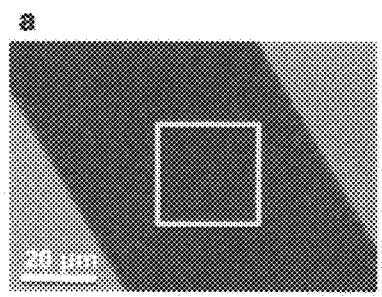
FIGS. 14A-D. Digital SEM images of printed lines annealed to (A, C) 250° C. and (B, D) 450° C. (C) and (D) are higher magnification SEM images of the highlighted area (yellow box) from images (A) and (B), respectively. Following 450° C. annealing, the EC residue is removed, leading to a sparse graphene network. This observation suggests the importance of EC decomposition products in maintaining electrical and mechanical integrity of the printed features.
Figure 14B:
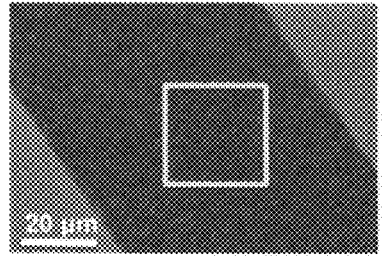
Figure 14C:
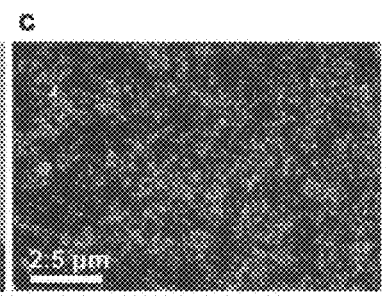
Figure 14D:
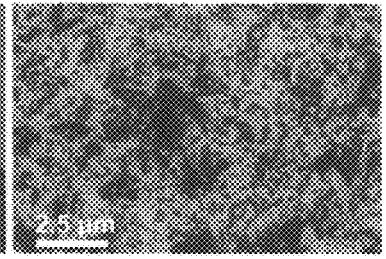

For a detailed assessment of the electrical performance of the printed features, 4 mm long lines with varying thicknesses were printed on HMDS-treated $SiO_2$ and annealed at 250° C. for 30 minutes. The line thickness increases linearly with the number of printed layers, with each layer adding ~14 nm to the thickness (FIG. 13D). The line resistivity reaches a relatively stable low value after only 3 printing passes, owing to the high concentration of the ink and the excellent morphology of the printed features (FIG. 13C). The measured conductivity of $2.5 \times 10^4 \pm 0.2 \times 10^4$ S/m (resistivity of $4 \times 10^{-3} \pm 0.4 \times 10^{-3}$ Ω.cm) for the printed lines after 10 printing passes is ~250 times higher than previously reported for inkjet printed graphene. This dramatic improvement indicates the effectiveness of the method presented here, which avoids the graphene degradation that occurs in competing processes based on ultrasonication of graphene in harsh solvents.

Thermal gravimetric analysis (TGA) of the ink indicates that EC decomposition occurs in two stages, with a low temperature charring beginning below 250° C. and volatilization and removal of the EC residue occurring at temperatures above 400° C. (FIG. 10). This observation coupled with the high electrical conductivity observed after annealing at temperatures of 250-350° C. suggests that the initial decomposition of EC enables efficient charge transport through the graphene network. Because cellulose derivatives can thermally decompose into aromatic species, any resulting pi-pi stacking between the residues and the graphene flakes provides relatively efficient charge transport. In addition, the increase in resistivity upon annealing at 400-450° C. correlates well with the removal of residue from the film in the second stage of EC decomposition. Furthermore, the EC residue creates a dense and continuous film, as determined from scanning electron micrographs of printed lines following annealing at 250° C. and 450° C. (FIG. 14). This film densification could potentially enhance the mechanical properties of the printed graphene features and enable a robust tolerance for bending stresses in flexible applications.

To assess mechanical properties, lines were printed on polyimide (DuPont Kapton® 125 μm) substrates and annealed at 250° C. for 30 minutes. (Such a polyimide is representative of a range of flexible polymeric materials of the sort well-known to those skilled in the art and available for use as a bendable/foldable substrate.) Various flexibility tests were employed to characterize these printed graphene lines. For example, to investigate the reliability over a large number of bending cycles, the electrical resistance was measured up to 1000 cycles. As shown in FIG. 15A, there is no observable degradation in the line conductivity for a bending radius of curvature of 3.4 mm. Even at a radius of 0.9 mm, the resistance remained nearly unchanged after a marginal initial increase. At this radius of curvature, some cracking was observed in the substrate, which suggests that the small loss of conductivity is a limitation of the substrate rather than the printed features. The electrical performance of the printed features was also measured under applied stress for various radii of bending (FIG. 15B), with no observed loss in conductivity. As a final test, the resistance of the graphene lines was measured in a folded state, as shown in FIG. 15C-E, again resulting in only a slight decrease in conductivity on the order of 5% that can again be likely attributed to substrate cracking. Overall, these mechanical tests show the utility of the present graphene inks in flexible, and possibly even foldable, electronic applications.

As shown by the preceding, this invention provides a graphene ink from a graphene/EC powder produced using only room temperature processing methods. The graphene/EC powder allows for careful tuning of the ink to achieve stable inkjet printing of features on a variety of substrates with excellent morphology, and can be applied to other printing techniques in a straightforward manner. In addition, the conductivity of printed features following mild annealing is over two orders of magnitude better than previously reported for inkjet printed graphene despite a smaller flake size, indicating efficient flake-flake charge transport. Such results are believed enabled by a synergistic EC binder for graphene exfoliation, which reduces flake-flake junction resistance upon annealing relative to graphene films containing residual solvent or surfactant. Finally, low processing temperatures enable compatibility with flexible substrates, thereby allowing demonstration of the high tolerance of printed graphene features to bending stresses. With this unique combination of attributes, the graphene-based inks of this invention can find utility in a wide range of printed, flexible, and/or foldable electronic applications.

EXAMPLES OF THE INVENTION

The following non-limiting examples and data illustrate various aspects and features relating to the methods and/or compositions of the present invention, including the preparation and use of concentrated graphene solutions, graphene ink compositions and related composites, as are described herein. In comparison with the prior art, the present methods provide results and data which are surprising, unexpected and contrary thereto. While the utility of this invention is illustrated through the use of several graphene dispersion agents and hydrophilic organic solvents, together with several hydrophobic fluid components which can be used therewith, it will be understood by those skilled in the art that comparable results are obtainable with various other dispersion agents and hydrophilic or hydrophobic solvents, as are commensurate with the scope of this invention.

Example 1a

Exfoliation and Sedimentation Processing of Graphene 2.5 g of natural graphite flake (3061 grade, Asbury Graphite Mills) was added to 50 mL of 1% w/v ethyl cellulose (EC) (Aldrich) ethanol (EtOH) solution inside a plastic 50 mL centrifuge tube (note that Aldrich does not explicitly provide the molecular weight of its EC; rather, the viscosity is specified (e.g., 4 cP) when the EC is loaded at 5% w/v in 80:20 toluene:ethanol). Two tubes containing this mixture were simultaneously sonicated in a Bransonic 3510 tabletop ultrasonic cleaner for 3 hr at 40 kHz and 100 W. In order to efficiently sediment out the graphite flakes, the centrifugation was performed in a two-step process. First, the sonicated graphene dispersions were centrifuged in a large volume centrifuge (Beckman Coulter Avanti J-26 XP Centrifuge) for 10 min at 7,500 rpm to remove the fast sedimenting graphite flakes. The supernatant was then decanted from each 50 mL centrifuge tube and combined. A second sedimentation step was then performed on this combined solution in two 250 mL tubes for 4.5 hr at 7,500 rpm or an average relative centrifugal force (RCF) of 6,804 g.

Example 1b

Thermal Stability of Polymer Enhanced Graphene Dispersions

Experiments were undertaken to highlight the thermal stability of EC-based graphene dispersions, of the sort discussed above, especially in comparison to traditional surfactant-based dispersions. Here, graphene dispersions in 1% w/v EC-EtOH and 1% w/v sodium cholate-water (SC-$H_2O$, prior art) were produced using the sonication and centrifugation procedures detailed above. Both dispersions were then concentrated to ~1 mg/mL via thermal evaporation.

At elevated temperatures, graphene flakes in the SC-based dispersion agglomerate rapidly to form precipitates, while the EC-based dispersion remains well dispersed. To quantify their thermal stabilities, both concentrated dispersions were diluted to 0.1 mg/mL and centrifuged at 15,000 rpm for 1 min. The UV-vis absorbance spectra for their supernatants were then obtained. Using the same absorbance coefficient discussed above (2460 L/gm at 660 nm), it was determined that 97.7% of the graphene remained suspended in the EC-EtOH medium, while only 18.1% remained suspended in the SC-H$_2$O solution. The stability of these polymer-based graphene dispersions can be exploited in subsequent post-synthetic processing.

Example 1c

Enhanced Graphene Production Efficiency in DMF

Improvement in graphene production is also demonstrated by adding EC to dimethylformamide (DMF), which has moderate intrinsic graphene solubility. In this case, natural graphite was bath sonicated for 3 h at 50 mg/mL in both DMF and 1% w/v EC-DMF. After centrifugation at 7500 rpm for 4.5 h to remove the thick graphite flakes, UV-vis absorbance spectra were taken to assess their graphene concentrations (FIG. 1C).

Using an absorbance coefficient of 2460 L/g·m at 660 nm, the graphene concentration for the DMF and EC-DMF dispersions were determined to be 14.1 and 82.8 µg/mL, respectively. (See, Hernandez, Y.; Nicolosi, V.; Lotya, M.; Blighe, F. M.; Sun, Z.; De, S.; McGovern, I. T.; Holland, B.; Byrne, M.; Gun'Ko, Y. K.; Boland, J. J.; Niraj, P.; Duesberg, G.; Krishnamurthy, S.; Goodhue, R.; Hutchison, J.; Scardaci, V.; Ferrari, A. C.; Coleman, J. N., *Nat. Nanotechnol.* 2008, 3, 563-568). It follows that, the addition of 1% w/v EC to DMF yielded a 5.9-fold improvement in the graphene exfoliation/production efficiency. Overall, improving the graphene exfoliation efficiency in organic solvents with moderate to high intrinsic graphene solubilities can both reduce material waste and benefit printed electronic and related applications where higher graphene-to-dispersant ratios are required.

In accordance with this invention, without limitation, various other $C_2$-$C_5$ alcohols, esters, ethers, ketones and amides can be used, in conjunction with a cellulosic polymer, to suspend and exfoliate graphene.

Example 2

Graphene Concentration Via Iterative Solvent Exchange. To ensure proper hydrophobic phase separation, water, in excess of four times the volume of the starting graphene solution, is added. A brief sonication step, of approximately 1 min, is also performed after each graphene concentration and graphene addition step to facilitate phase separation and solution mixing.

Example 3

SiO$_2$ Graphene Deposition. Graphene flakes from both the sedimented graphene solution and third-iteration concentrated graphene solution were deposited onto 100 nm thick oxide silicon wafers for imaging. The wafers were first submerged in 2.5 mM 3-aminopropyl triethoxysilane aqueous solution to functionalize the surface with a hydrophobic self-assembling monolayer for 30 min. The substrates were then rinsed with water and dried under a stream of N$_2$. Both graphene solutions were then diluted to approximately 0.02 mg/mL in ethanol after which a drop of each was placed onto the functionalized wafers for 10 min. The drops were then blown off under a stream of N$_2$, and the wafer was rinsed with water. To remove the residual EC, the wafers were annealed for 20 min at 400° C. in air.

Example 4

Atomic Force Microscopy Thickness Measurements. All atomic force microscopy (AFM) images were obtained using a Thermo Microscopes Autoprobe CP-Research AFM in tapping mode using cantilever B on MikroMasch NSC NSC36/Cr—AuBS probes. 2 µm×2 µm images were collected using identical scanning parameters. Flake thicknesses were determined using line-scan thickness profiles across flakes larger than 5,000 nm$^2$ while avoiding regions where EC residues were present. (FIG. 3) 146 flakes were analyzed on the wafer deposited with the sedimented graphene solution, and 156 flakes were analyzed for the wafer deposited with the third-iteration concentrated graphene solution.

Example 5

Thin Film Deposition. Graphene-EC and graphene thin films were blade coated from concentrated graphene inks onto glass slides using either 1 or 2 layers of 3M Scotch Magic Tape (about 30-about 40 µm per layer) as masks. In order to optimize ink rheology for uniform film deposition, 10% w/v EC (Aldrich, 22 cP, 5% in toluene:ethanol 80:20) in ethanol was added to the graphene ink. The modified graphene ink was deposited into 2cm×2 cm squares on 2.54 cm×2.54 cm silica glass slides. To obtain films with different optical densities, select films were also spun at 10,000 rpm for 3 min. These films were then allowed to dry overnight, and the mask was removed to obtain a transparent graphene-polymer film (not shown). Graphene thin films require an additional annealing step, performed for 30 min at 400° C. in air, to remove the EC and enhance flake-to-flake contact. After annealing, these graphene thin films were rinsed in acetone before optical transmittance and four point probe measurements.

Example 6

Figure 4:
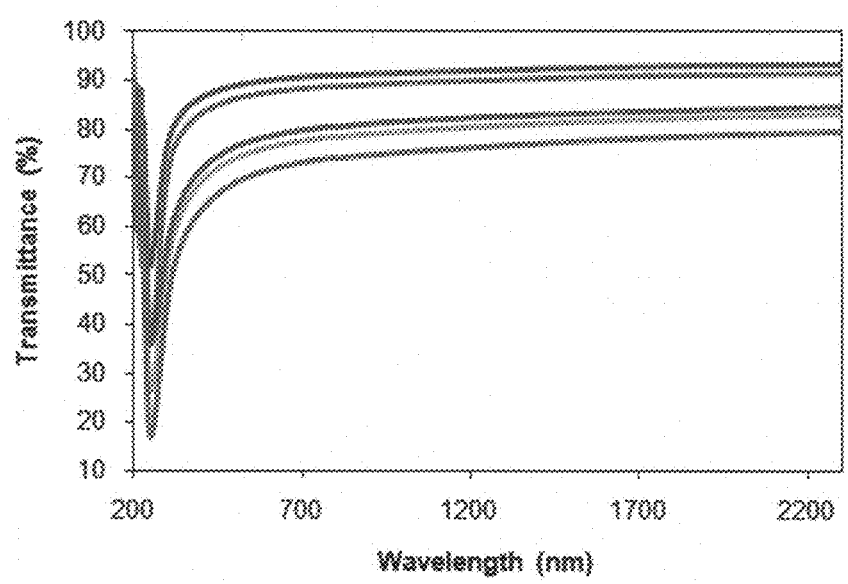
FIG. 4. Optical transmittance spectra for the five graphene conductive films analyzed.

Optical Absorbance and Transmittance Measurement. Optical absorbance measurements to determine graphene solution concentrations and transmittance measurements for transparent conductive graphene thin films were performed using a Varian Cary 5000 spectrophotometer. Background from the optical cuvette, EC-ethanol solution, and glass slide were subtracted from the spectra of the graphene dispersions and films. Due to their high absorbance, concentrated graphene solutions were diluted either 4× or 10× to ensure that the optical absorbance was within the detector limits. As expected; the graphene thin films of the preceding example provide featureless optical absorbance spectra with high transparency at visible and infrared wavelengths (FIG. 4).

Example 7

Figure 5:
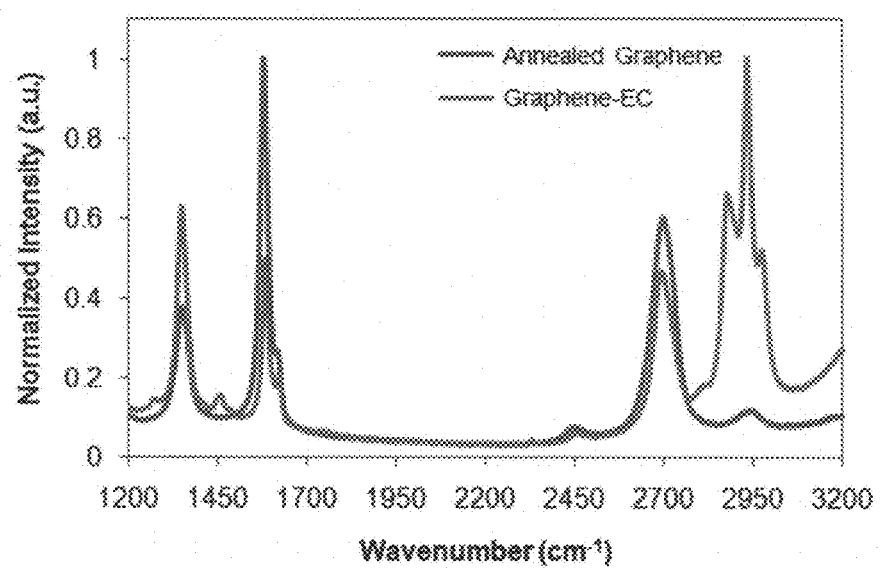
FIG. 5. Representative Raman spectra of the annealed graphene thin film and graphene-EC nanocomposite. These spectra were obtained by combining five individual spectra from different locations of each film and with the intensity of the highest peak normalized to unity.

Raman Spectroscopy of the Graphene Films. Raman spectroscopy was obtained using a Renishaw inVia Raman microscope with an excitation wavelength of 514 nm. Five spectra were obtained on different areas of the annealed graphene film and the graphene-EC nanocomposite using a beam size of 1-2 µm, allowing multiple flakes to be probed in each measurement. These spectra showed minimal variation across different locations and were combined to form a representative Raman spectrum for the entire film (FIG. 5). Typical Raman spectra for the annealed graphene film exhibit four primary peaks: the G band at ~1,590 cm$^{-1}$, 2D band at ~2,700 cm$^{-1}$, and the disorder-associated D and D' bands at ~1,350 cm$^{-1}$ and ~1,620 cm$^{-1}$ respectively. The intensity ratio of the D and G bands, I(D)/I(G), is a measure of the level of defects that are introduced during the sonication and annealing processes. The I(D)/I(G) value for the annealed graphene film was ~0.38, significantly less than reported values for surfactant exfoliated graphene solutions with a similar size distribution (~0.93) (see, Green, A. A.; Hersam, M. C.; *Nano Lett.* 2009, 9, 4031-4036) and heavily reduced graphene oxide (~0.82) (Gao, W.; Alemany, L. B.; Ci, L.; Ajayan, P. M. *Nature Chem.* 2009, 1 (5), 403-408) but higher than that for larger-sized solvent exfoliated graphene flakes. (See, Hernandez, Y.; Nicolosi, V.; Lotya, M.; Blighe, F. M.; Sun, Z.; De, S.; McGovern, I. T.; Holland, B.; Byrne, M.; Gun'Ko, Y. K.; Boland, J. J.; Niraj, P.; Duesberg, G.; Krishnamurthy, S.; Goodhue, R.; Hutchison, J.; Scardaci, V.; Ferrari, A. C.; Coleman, J. N. *Nat. Nanotechnol.* 2008, 3, 563-568.) The measured value of ~0.38 indicates that large quantities of defects or oxidation were not introduced during exfoliation and annealing.

Example 8

Figure 6:
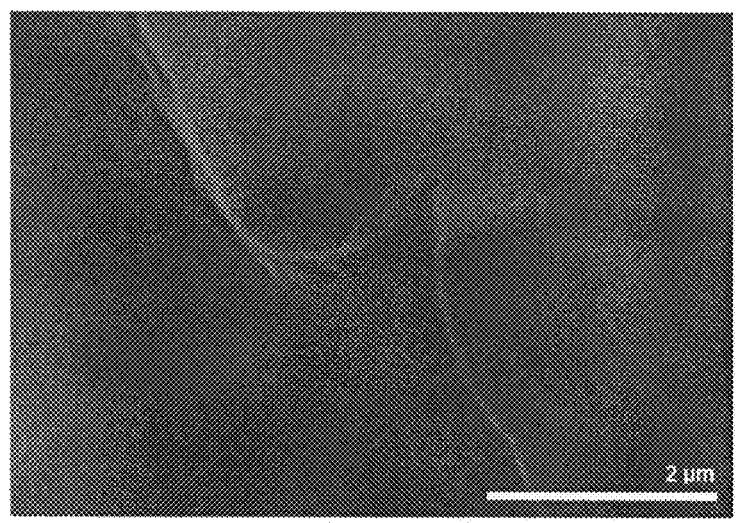
FIG. 6. Digital SEM image of an EC film fracture surface without graphene. The absence of the fracture terraces, in contrast to those observed in FIG. 2B, indicates that the anisotropic fracture behavior of the EC-graphene nanocomposite results from aligned graphene flakes.

Nanocomposite Fracture Surface. The graphene-EC and graphene-free EC films were fractured using shearing forces applied orthogonally to the planes of the films. The fractured surfaces were then analyzed using SEM to gauge the adhesion strength of graphene to EC and orientation of graphene flakes. (See, FIG. 6.)

Example 9

Scanning Electron Microscopy. Scanning electron microscopy of the transparent conductive graphene thin films and fracture surfaces of graphene-EC nanocomposites was performed on a Hitachi 4800 scanning electron microscope using a 1 kV accelerating voltage.

Example 10

Figure 7A:
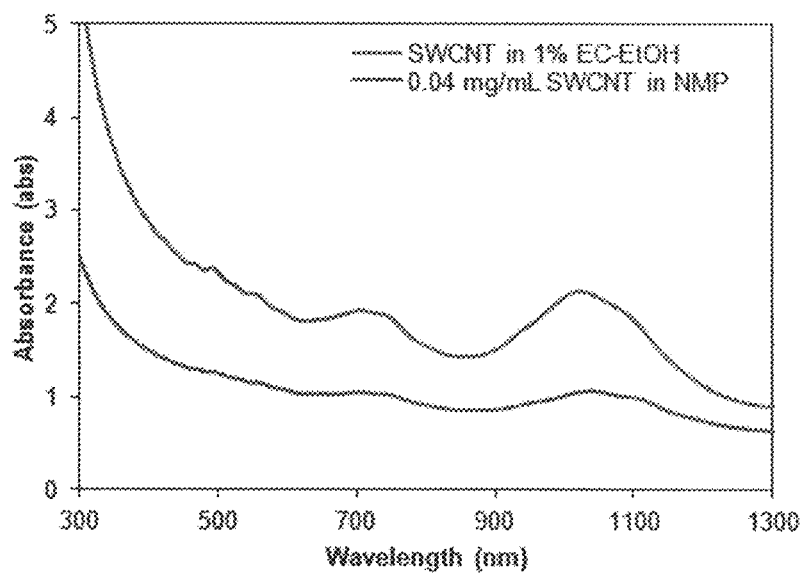
FIGS. 7A-B. (A) absorbance spectra for dispersions of single-walled carbon nanotubes, showing enhanced debundling and concentration using ethyl cellulose-ethanol (upper plot), in accordance with this invention. (The reference dispersion also illustrates the utility of methylpyrrolidone as an organic solvent component, in accordance with this invention.) (B) a digital SEM image of an annealed SWCNT thin film.
Figure 7B:
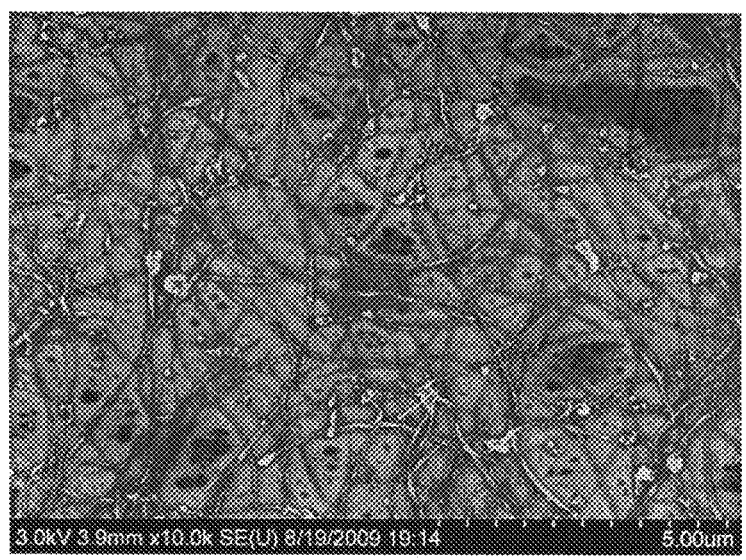

Dispersion and iterative solvent exchange can be used concentrate fluid media comprising other nanodimensioned materials, such as single-walled carbon nanotubes, using procedures analogous to those described in examples 1-2. For instance, single walled carbon nanotubes (SWCNTs) were dispersed in 1% EC-EtOH via 1 h horn sonication and 4.5 h centrifugation at 7500 rpm. Compared to a reference 0.04 mg/mL SWCNT/N-methylpyrrolidone (NMP) dispersion, without EC, the concentration of the 1% EC-EtOH dispersion was determined to be around 0.75 mg/mL (see, FIG. 7A). Solvent exchange with terpineol provided a concentrated SWCNT-EC ink. Likewise, substrate deposition and material characterization can be accomplished, using techniques of sort described in examples 3-9. A transparent SWCNT thin film was prepared by blade coating and annealing the aforementioned ink at 400° C. in air for 30 minutes. An SEM image of the annealed SWCNT thin film is shown in FIG. 7B.

Example 11

Solvent Exfoliation and Processing of Graphene. 10.0 g natural graphite flake (Asbury Graphite Mills, 3061 Grade) was dispersed in a solution of 200 mL, 2% w/v ethyl cellulose (EC) in ethanol (EC: Aldrich, viscosity 4 cP, 5% in toluene/ethanol 80:20, 48% ethoxy; ethanol: Koptec, 200 proof) in a stainless steel beaker. The dispersion was sonicated using a probe sonication system (Fisher Scientific Sonic Dismembrator Model 500, 13 mm Branson tip) for 90 minutes at 50 W in an ice water bath. The resulting dispersion was centrifuged (Beckman Coulter Avanti® J-26 XPI) at 7,500 rpm (~10,000 g) for 15 minutes, and the supernatant was collected. To this dispersion, a 0.04 g/mL aqueous solution of NaCl (Sigma-Aldrich, >99.5%) was added in a 1:2 volume ratio. The resulting mixture was centrifuged at 7,500 rpm for 8 minutes, after which the supernatant was removed. The resulting graphene/EC solid was dried, dispersed in ethanol, and passed through a 5 μm sieve (Industrial Netting, BS0005-3X1) to remove any large particles that might compromise inkjet printing. The dispersion was then flocculated again, with the same parameters as above. To remove any residual salt, the resulting graphene/EC solid was washed with deionized water and isolated by vacuum filtration (Millipore Nitrocellulose HAWP 0.45 μm filter paper). This isolated graphene/EC product was then dried, yielding a fine black powder. (Related graphene exfoliation and concentration procedures, with alternate ordering of steps and/or techniques, are as described in the aforementioned co-pending '608 application, the entirety of which is incorporated herein by reference.)

Example 12

Atomic Force Microscopy (AFM) Characterization of Graphene Flakes. For graphene flake characterization, a sample of graphene/EC dispersion in ethanol was deposited onto Si/SiO$_2$ for AFM characterization. Prior to sample deposition, Si/SiO$_2$ wafers were immersed in 2.5 mM 3-aminopropyl triethoxysilane (Aldrich, 99%) in 2-propanol (Macron Chemicals, 99.5%) for 30 minutes, after which they were rinsed with 2-propanol and blown dry under a stream of N$_2$. A diluted graphene dispersion was dropcast onto the wafers and left for 10 minutes, after which it was blown dry with N$_2$ and rinsed with 2-propanol. To remove ethyl cellulose and residual 3-aminopropyl triethoxysilane, the samples were annealed at 400° C. in a tube furnace for 30 minutes. AFM images were obtained using a Bruker ICON PT AFM System in tapping mode with a Veeco Model RTESP (MPP-11100-10) cantilever. The images were collected with 2 μm×2 μm scans, and particle characteristics were determined using Nanoscope Analysis software. Flake thickness was determined from line scans, and flake area was measured automatically using the software. Flake thickness was measured for 355 flakes, and flake area was measured for 216 flakes. (See FIGS. 9A-C.)

Example 13

Thermal Gravimetric Analysis (TGA) of Graphene/EC Powder. Powder samples of pure ethyl cellulose and graphene/EC powder were analyzed using a Mettler Toledo TGA/SDTA851 system at a heating rate of 5° C./min in air. (See FIGS. 10A-B.)

Example 14

Si/SiO$_2$ Surface Modification. Surface modification of Si/SiO$_2$ wafers with hexamethyldisilazane (HMDS, Aldrich, >99%) employed a vapor treatment technique. Si/SiO$_2$ wafers were cleaned by bath sonication in ethanol for 20 minutes followed by 5 minutes O$_2$ plasma treatment (Harrick Plasma, Plasma Cleaner PDC-001). The wafers were then suspended over a dish of HMDS in a contained vessel for 30 minutes, while the HMDS vapor coated the surface. The wafers were then rinsed with 2-propanol and dried under a stream of N$_2$. The resulting water contact angle was ~66°.

Example 15

Ink Preparation and Printing. To prepare the ink for inkjet printing, graphene/EC powder was dispersed in an 85:15 cyclohexanone/terpineol mixture at a concentration of 2.4 wt % by bath sonication. The resulting ink was passed through a 0.45 µm filter (Pall Acrodisc® CR 25 mm syringe filter, 0.45 µm PTFE Membrane) to remove any dust or contaminants that could destabilize printing. The ink was printed using a Fujifilm Dimatix Materials Printer (DMP-2800) equipped with a 10 pL drop cartridge (DMC-11610). The images of drop formation were captured using the built-in camera of the printer (FIG. 8F). The shear viscosity of the ink was measured using a Physica MCR 300 rheometer equipped with a 50 mm cone and plate geometry at shear rates of 10-1000 $s^{-1}$. The temperature was controlled by a Peltier plate for viscosity measurements at 25, 30, 35 and 40° C. to evaluate the optimal printing temperature. The printing was carried out at 30° C., for which the viscosity was 10-12 mPa·s at shear rates of 100-1000 $s^{-1}$ (FIG. 11). The surface tension was estimated to be ~33 mN/m by the drop weight method. Calibration solvents included 2-propanol, ethanol, deionized water and ethylene glycol.

Example 16

Scanning Electron Microscopy Characterization of Printed Features. Scanning electron micrographs of printed features following 250° C. and 450° C. annealing were obtained on a Hitachi SU8030 Field Emission SEM. (See FIGS. 14A-D.)

Example 17

Annealing Study of Graphene Films. An ink containing graphene/ethyl cellulose in ethanol/terpineol was prepared for blade-coating films. Graphene/ethyl cellulose powder (~100 mg) was dispersed in 2 mL of 4:1 ethanol/terpineol v/v by bath sonication. This ink was blade-coated onto glass slides (VWR Micro Slides) into a 15×15 mm2 film defined by a mask of scotch tape. The sample was then annealed in a tube furnace (Thermo Scientific, Lindberg Blue M). The sheet resistance of the resulting film was measured by a 4-point probe technique, employing the appropriate geometric correction factors, while the film thickness was measured by profilometry (Dektak 150 Stylus Surface Profiler). These results were used to calculate the resistivity plotted in FIG. 13A-B.

Example 18

Electrical Characterization of Printed Features. For electrical characterization, the printed graphene lines were annealed at 250° C. for 30 minutes. The line resistance was measured with Au probes. It was verified that the line resistivity did not vary with measured line length, indicating that these probes introduced a negligible contact resistance. The length of the lines was measured using optical microscopy, such that the distance between the probes was used for the line length and not the total length of the printed line. The line resistance was measured for six lines for each data point to provide error bars. The line thickness and width were measured by AFM and used to calculate resistivity of the printed features. For the line thickness data (FIG. 13D), the average thickness over the center 50% of the line was taken as the line thickness.

Example 19

Flexibility Assessment. For printing on flexible substrates, polyimide (DuPont Kapton®, 125 µm) was cleaned prior to use by bath sonication in ethanol for 20 minutes. Graphene lines were printed on the polyimide with six printing passes using the same printing parameters as before. For electrical tests over many bending cycles (FIG. 15A), 30 mm lines were used to enable handling while also ensuring that a larger proportion of the line was subject to mechanical stress. For the electrical measurements in a flexed state (FIGS. 15B-D), 60 mm lines were used to enable the experimental setup. The error bars were obtained by measuring 8 lines for FIGS. 15A-B and 12 lines for FIG. 15C.

Example 20

High Shear Mixing For the Solution-Phase Exfoliation of Graphene. As discussed above, the production of graphene for printed electronics requires large volumes of material to expand the scope of potential applications. Conventional methods employed in academic laboratories, particularly ultrasonication, have limited scalability due to the high energy intensity required and the small process volumes. High shear mixing offers an attractive alternative with straightforward scaling to large volumes (~$m^3$) and energy-efficient exfoliation. The use of shear mixing in the production of a graphene/ethyl cellulose (EC) composite, for inkjet printing, is evaluated in FIG. 16. Higher graphene concentrations were achieved for a larger volume of dispersion using shear mixing instead of ultrasonication, while the as-produced graphene exhibited similar flake thickness and area. In conjunction herewith, shear mixing can be employed using apparatus, conditions and techniques of the sort well-known to those skilled in the art and made aware of this invention.

For instance, shear mixing was performed using a Silverson L5M-A Laboratory Mixer with a 32 mm mixing head and square hole high shear screen. 90.0 g natural graphite flake (Asbury Graphite Mills, 3061 Grade) was dispersed in a solution of 18 g ethyl cellulose (EC) in 900 mL ethanol (EC: Aldrich, viscosity 4 cP, 5% in toluene/ethanol 80:20, 48% ethoxy; ethanol: Koptec, 200 proof). The dispersion was shear mixed for 120 minutes at 10,230 rpm to produce graphene, with samples collected at intervals and centrifuged for analysis. Such a procedure can improve production rates by ~10×.

Example 21

Figure 16A:
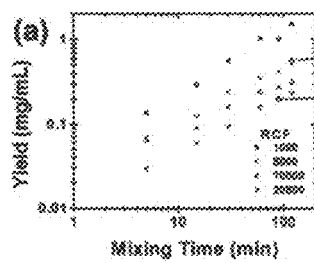
FIGS. 16A-D. Shear mixing of graphene. (A) Graphene concentration for shear mixing as a function of time and centrifuge rate, highlighting data points for sonication and shear mixing batch processes. (B) Representative digital AFM image of graphene flakes produced by shear mixing. (C) Flake thickness and (D) flake area distributions for graphene produced by shear mixing.
Figure 16B:
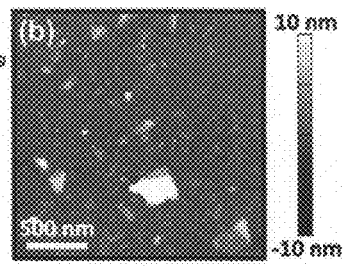
Figure 16C:
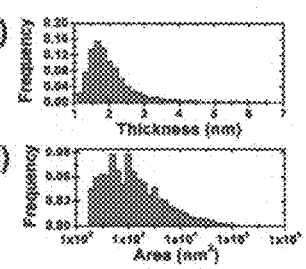
Figures 16D, 17:
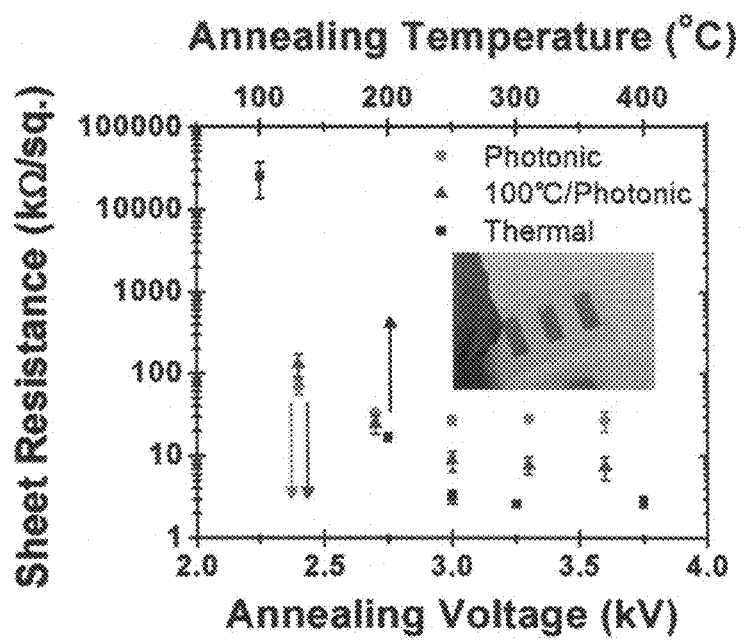
FIG. 17. Photonic annealing of graphene patterns. Sheet resistance of graphene patterns with different post-processing conditions, including thermal annealing, photonic annealing, and combined thermal and photonic annealing. (inset) Digital optical image of conductive graphene patterns on polyethylene terephthalate (PET) following combined thermal and photonic annealing.

Photonic Annealing of Graphene Patterns. Thermal annealing of a graphene/EC material can reduce applicability with respect to some plastic substrates with low glass transition temperatures. Photonic annealing, on the other hand, presents an alternative annealing strategy compatible with a broader range of substrates. By applying a rapid, intense light pulse, the graphene/EC material is selectively heated due to its strong optical absorption while the transient nature of the pulse limits the heating of the substrate. To optimize the effectiveness of photonic annealing, graphene/EC films were printed with a high graphene content (e.g., ~65% wt.). The sheet resistance of the films following thermal and photonic annealing was measured for a range of annealing conditions. As shown in FIG. 17, photonic annealing yields a sheet resistance approximately 4× greater than that resulting from optimized thermal annealing, while maintaining compatibility with plastic substrates limited to a maximum temperature of approximately 150° C. Such results show that process limitations relating to thermal annealing of a graphene/EC material can be mitigated. In conjunction herewith, photonic annealing can be employed using apparatus, conditions and techniques of the sort well-known to those skilled in the art and made aware of the present invention.

To illustrate photonic annealing, graphene/EC films were inkjet printed from an ink containing ~1.7 mg/mL graphene and ~0.85 mg/mL EC dispersed in an 85:15 mixture of cyclohexanone and terpineol. Printed films on polyethylene terephthalate (PET, DuPont Teijin Films Melinex® ST579/200) were post-processed with photonic annealation using a Xenon Sinteron 2000 pulsed light source, with a 1 ms light pulse at 2.4-3.6 kV operation. Additional films on PET were first thermally annealed at 100° C. in air prior to the same photonic annealing treatment.

As demonstrated, above, the present invention provides a method for enhanced concentration of graphene and related nanomaterials to provide, in particular, graphene concentrations heretofore unrealized in the art. Such techniques are rapid and scalable, making more readily available the various mechanical, chemical and electronic attributes of such materials over a wide range of end-use applications.

While the principles of this invention have been described in conjunction with certain embodiments, it should be understood clearly that these descriptions are provided only by way of example and are not intended to limit, in any way, the scope of this invention. For instance, the present invention can be applied more specifically to the preparation of concentrated carbon nanotube compositions and related composite materials, using methods of the sort described herein, or in a manner as described in conjunction with use of carbon nanotubes in the aforementioned and incorporated '608 reference. Likewise, the present invention can be used in conjunction with various flexible, bendable substrates. While polyimides and polyethylene terephthalates have been described, substrates and corresponding composites can comprise and be prepared using various other flexible, bendable substrate materials, as would be understood by those skilled in the art made aware of this invention.

We claim:

1. A method of using a cellulosic polymer for preparing a concentrated graphene medium, said method comprising:
   exfoliating a graphene source material with a medium comprising an organic solvent at least partially miscible with water and a dispersing agent comprising a cellulosic polymer, said dispersing agent at least partially soluble in said organic solvent;
   contacting at least a portion of said exfoliated graphene medium with an aqueous medium to concentrate exfoliated graphene in a solid composition comprising graphene and a said cellulosic polymer;
   isolating said solid composition from said exfoliating and said aqueous media; and
   contacting said solid graphene composition with a hydrophobic fluid component.

2. The method of claim 1 wherein said cellulosic polymer comprises an ethyl cellulose.

3. The method of claim 1 wherein said organic solvent is selected from $C_2$ - $C_5$ alcohols, esters, amides, ethers and ketones and combinations thereof.

4. The method of claim 3 wherein said organic solvent is selected from ethanol and dimethylformamide.

5. The method of claim 1 wherein said hydrophobic fluid component comprises a component selected from terpenes, terpene alcohols and combinations thereof.

6. The method of claim 1 wherein said hydrophobic fluid component comprises a terpineol and cyclohexanone.

7. The method of claim 1 wherein said graphene source material is graphite.

8. The method of claim 1 comprising deposition of said graphene composition on a substrate.

9. The method of claim 8 wherein said graphene composition is annealed.

10. The method of claim 9 wherein said graphene composition is photoannealed.

11. The method of claim 1 wherein said exfoliation comprises shear mixing said graphene source material and said medium.

12. The method of claim 11 wherein said organic solvent is selected from $C_2$ - $C_5$ alcohols, esters, amides, ethers and ketones and combinations thereof; and said dispersing agent comprises an ethyl cellulose.

13. A method of preparing a graphene ink composition, said method comprising:
   exfoliating a graphene source material with a medium comprising an organic solvent selected from ethanol and dimethylformamide, and an ethyl cellulose;
   contacting at least a portion of said exfoliated graphene medium with an aqueous medium to concentrate exfoliated graphene and ethyl cellulose in a solid composition comprising graphene and said ethyl cellulose;
   isolating said solid composition from said exfoliating and said aqueous media; and
   contacting said solid graphene ethyl cellulose composition with a hydrophobic fluid component to provide a graphene ink composition.

14. The method of claim 13 wherein said exfoliating comprises shear mixing said graphene source material and said medium.

15. The method of claim 13 comprising printing said graphene ink composition on a substrate.

16. The method of claim 15 wherein said graphene ink composition is photoannealed.

* * * * *